United States Patent [19]
Schilham

[11] Patent Number: 5,673,522
[45] Date of Patent: Oct. 7, 1997

[54] JUNCTION BOX FOR LOW PROFILE RAISED PANEL FLOORING

[75] Inventor: Jan J. Schilham, Leusden, Netherlands

[73] Assignee: Guilford, Inc., Guilford, Me.

[21] Appl. No.: 389,753

[22] Filed: Feb. 15, 1995

Related U.S. Application Data

[63] Continuation-in-part of Ser. No. 294,441, Aug. 23, 1994, which is a continuation-in-part of Ser. No. 218,373, Mar. 25, 1994.

[51] Int. Cl.$^6$ ...................................................... E04B 5/43
[52] U.S. Cl. .......................... 52/263; 52/220; 52/220.5; 174/50
[58] Field of Search .................... 52/220.2, 220.3, 52/220.5, 263; 174/48, 49, 50

[56] References Cited

U.S. PATENT DOCUMENTS

| | | |
|---|---|---|
| 1,861,359 | 5/1932 | Pyron . |
| 2,089,893 | 8/1937 | Greulich . |
| 2,680,775 | 6/1954 | Wiesmann . |

(List continued on next page.)

FOREIGN PATENT DOCUMENTS

| | | |
|---|---|---|
| 01197957B1 | 10/1986 | European Pat. Off. . |
| 0218108B1 | 4/1987 | European Pat. Off. . |
| 0352435A3 | 1/1990 | European Pat. Off. . |
| 1133496 | 3/1957 | France . |
| 1307901 | 9/1962 | France . |
| 1547666 | 11/1968 | France . |
| 1601001 | 9/1970 | France . |
| 2041599 | 1/1971 | France . |
| 2623029 | 5/1989 | France . |
| 1196345 | 7/1965 | Germany . |
| 2102050 | 1/1971 | Germany . |
| 2314463 | 3/1973 | Germany . |
| 2353865 | 10/1973 | Germany . |
| 2650160A1 | 10/1976 | Germany . |

(List continued on next page.)

OTHER PUBLICATIONS

International Search Report of Application No. PCT/US96/15166 (Jan. 10, 1997).
"Access Floor" Brochure, The Hiross Group.
"Planning Tile & Floor" Brochure, vol. 2, Kokyuo.
"Powerflor Quick-Connect Wire Management" Brochure, Powerflor, Inc.
10270/COD, Buyline 4657, "Co Design, Cablefloor, Non-Metallic, Low Profile Access Floor System," Brochure, Co. Design, Inc.

(List continued on next page.)

*Primary Examiner*—Christopher T. Kent
*Attorney, Agent, or Firm*—John S. Pratt; Mitchell G. Stockwell; Kilpatrick Stockton LLP

[57] ABSTRACT

A junction box that organizes and provides access electrical, data, telecommunications or other service lines routed through numerous channels formed between a false floor and an existing floor is disclosed. The housing of the junction box can be placed at virtually any point upon a false floor so that equipment disposed about the false floor can access outlets provided within the housing and connected to electrical, data, telecommunications cables or other service lines. Additionally, a hatch with a cable protector may be provided to cover the junction box while allowing cables to enter into the box for connection to the appropriate outlet. In another embodiment, a flange surrounds the top edge of the junction box housing and has holes through which pedestals or posts that support a false floor may insert. Guards, for preventing inadvertent contact with the outlets within the junction box, attach to the flange and run parallel to each side of the housing to form a channel that isolates cables leading to the junction box. The cables are connected to the outlets that may be held in the junction box by frames that slide into notches in the housing. The frames may be of a uniform size and formed from a dielectric to provide electrical insulation between the outlets and the junction box housing. The center of the frame can be machined in order to accept many different sizes and types of electrical components, thus eliminating the need to ground the junction box or redesign the housing each time a different supplier provides components.

19 Claims, 10 Drawing Sheets

U.S. PATENT DOCUMENTS

| | | |
|---|---|---|
| 2,830,332 | 4/1958 | Pawlowski . |
| 2,867,301 | 1/1959 | Benton . |
| 2,956,785 | 10/1960 | Riehl . |
| 3,025,934 | 3/1962 | Spiselman et al. . |
| 3,218,767 | 11/1965 | Stark . |
| 3,295,272 | 1/1967 | Kanno . |
| 3,387,422 | 6/1968 | Wanzer . |
| 3,645,054 | 2/1972 | Olvera . |
| 3,815,304 | 6/1974 | Schille et al. . |
| 3,852,928 | 12/1974 | Raith . |
| 3,894,370 | 7/1975 | Parazader . |
| 4,016,357 | 4/1977 | Abrahamsen . |
| 4,026,083 | 5/1977 | Hoyt et al. . |
| 4,035,967 | 7/1977 | Harvey . |
| 4,074,488 | 2/1978 | Ray, III . |
| 4,085,557 | 4/1978 | Tharp . |
| 4,124,324 | 11/1978 | Augis et al. ............ 52/220.5 X |
| 4,546,580 | 10/1985 | Ueno et al. . |
| 4,558,544 | 12/1985 | Albrecht et al. . |
| 4,573,302 | 3/1986 | Caretto . |
| 4,593,499 | 6/1986 | Kobayashi et al. . |
| 4,596,095 | 6/1986 | Chalfant . |
| 4,648,592 | 3/1987 | Harinishi . |
| 4,662,140 | 5/1987 | Porter et al. . |
| 4,682,453 | 7/1987 | Holmgren . |
| 4,744,194 | 5/1988 | Yasuyoshi . |
| 4,761,926 | 8/1988 | Rea et al. . |
| 4,773,196 | 9/1988 | Yoshida et al. . |
| 4,780,571 | 10/1988 | Huang . |
| 4,858,401 | 8/1989 | Thorp et al. . |
| 4,864,078 | 9/1989 | Bowman . |
| 4,883,503 | 11/1989 | Fish . |
| 4,905,437 | 3/1990 | Heather . |
| 4,923,723 | 5/1990 | Herbst . |
| 4,968,855 | 11/1990 | Le Paillier . |
| 4,993,202 | 2/1991 | Thiel . |
| 4,996,810 | 3/1991 | Forde . |
| 5,008,491 | 4/1991 | Bowman . |
| 5,042,569 | 8/1991 | Siegmund . |
| 5,049,700 | 9/1991 | Kobayashi et al. ............ 52/263 X |
| 5,052,157 | 10/1991 | Ducroux et al. . |
| 5,057,647 | 10/1991 | Bogden et al. . |
| 5,074,085 | 12/1991 | Ueda . |
| 5,082,712 | 1/1992 | Starp . |
| 5,090,169 | 2/1992 | Takeda et al. . |
| 5,105,595 | 4/1992 | Tokei et al. . |
| 5,184,438 | 2/1993 | Takeda et al. . |
| 5,187,907 | 2/1993 | Takeda et al. . |
| 5,197,244 | 3/1993 | Takeda et al. . |
| 5,245,805 | 9/1993 | Takeda et al. . |
| 5,263,289 | 11/1993 | Boyd ............ 52/220.5 X |
| 5,285,009 | 2/1994 | Bowman et al. . |
| 5,362,922 | 11/1994 | Whitehead . |
| 5,392,571 | 2/1995 | Greenfield ............ 52/263 X |
| 5,400,554 | 3/1995 | Lo ............ 52/263 X |
| 5,467,609 | 11/1995 | Feeney ............ 52/220.2 X |
| 5,483,776 | 1/1996 | Poppe ............ 52/263 X |

FOREIGN PATENT DOCUMENTS

| | | |
|---|---|---|
| 3415581A1 | 4/1984 | Germany . |
| 8807177 U | 6/1989 | Germany . |
| 9106389 U | 8/1991 | Germany . |
| 145017 | 10/1993 | Rep. of Korea . |
| 145018 | 10/1993 | Rep. of Korea . |
| 822738 | 10/1959 | United Kingdom . |
| 876117 | 8/1961 | United Kingdom . |
| 1104490 | 2/1968 | United Kingdom . |
| 1174562 | 12/1969 | United Kingdom . |
| 1425977 | 2/1976 | United Kingdom . |
| 2097836 | 11/1982 | United Kingdom . |
| 2127062 | 4/1984 | United Kingdom . |
| WO88/03207 | 5/1988 | WIPO . |

OTHER PUBLICATIONS

Cat. No. NF873E, "For Modern Offices, Network Floor (Flexible Floor Cabling System)," Brochure Kyodo Electric Co., Ltd., Tokyo, Japan (Mar. 1987).

Installationsboden, "zur flexiblen Kabelverlegung unter Bodenbelangen—bevorzugt unter Teppichfliesen—mit flachendeckendem Zugang fur Kabelsustritte in beliebiger Menge," (pub. after Mar. 19, 1989).

I.G. C328E "High Class Access Floors," Brochure, The Hiross Group (Feb. 1991).

B111E, "Today," Brochure, The Hiross Group (Feb. 1991).

10270/CTE, Buyline 2971, Form 9/92–19M, "Access Flooring Systems," Brochure, C–Tec, Inc. (1992).

SA–10271/1–91, "Access Floor Systems," Brochure, USG Interiors, Inc. (1991).

10270/HIT, Buyline 1976, "Hitachi Access Floor," Brochure, Hitachi Metals America, Ltd. (Oct. 1992).

6574/10270/MUL, "Mult–A–Frame," Brochure, Mult–A–Frame Corporation (1992).

"Access Floors Designed for Today's Business Environments," Brochure, Tate Access Floors, Inc. (Sep. 1988).

"Raised Flooring System H 16," Brochure, Herforder Teppichfabrik Huchzermeyer & Co. GmbH. (English translation on each page, 1989).

"Concealed Service Floor Boxes," Brochure, Steel City ®, (Feb. 11, 1994, Facsimile Transmission Date).

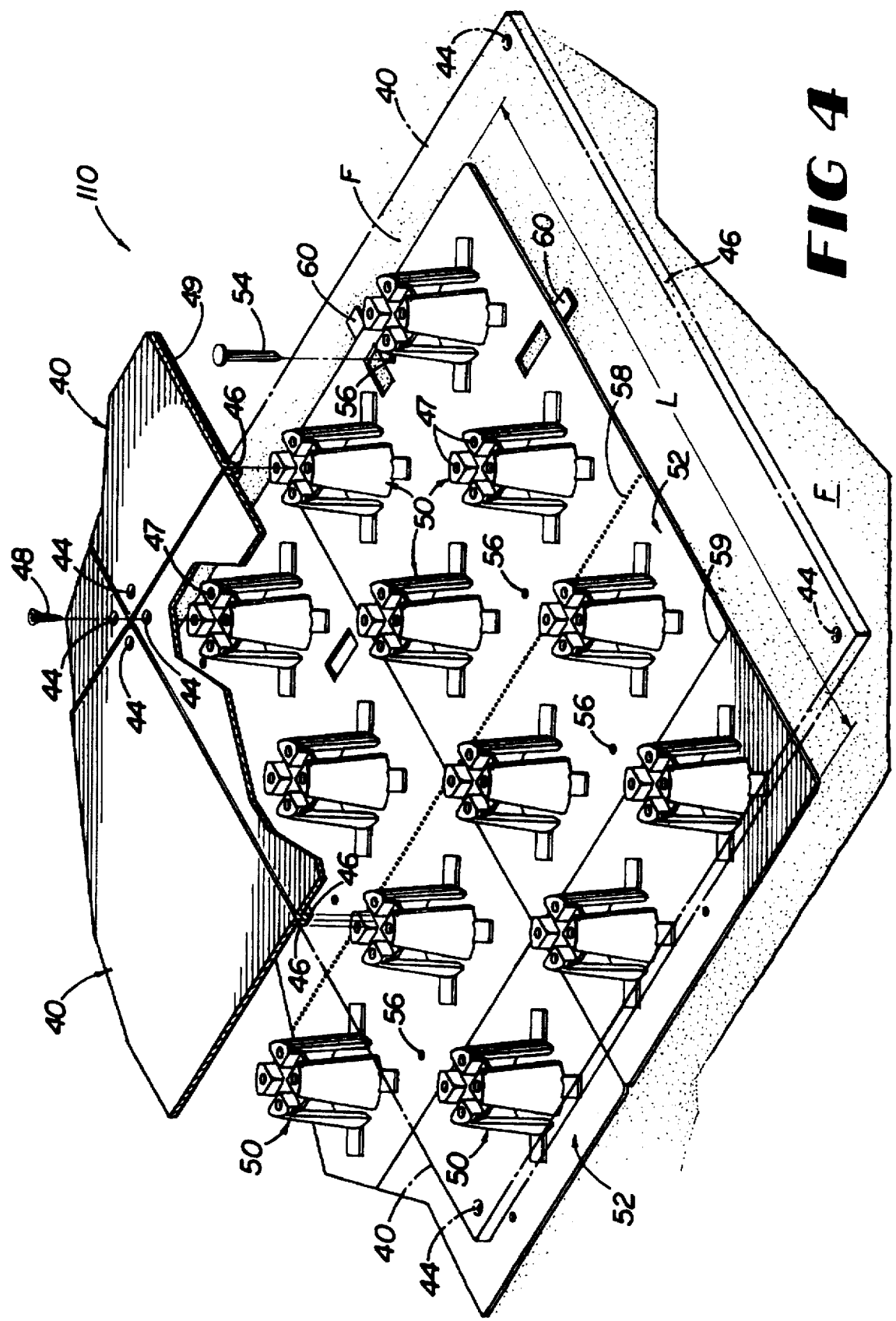

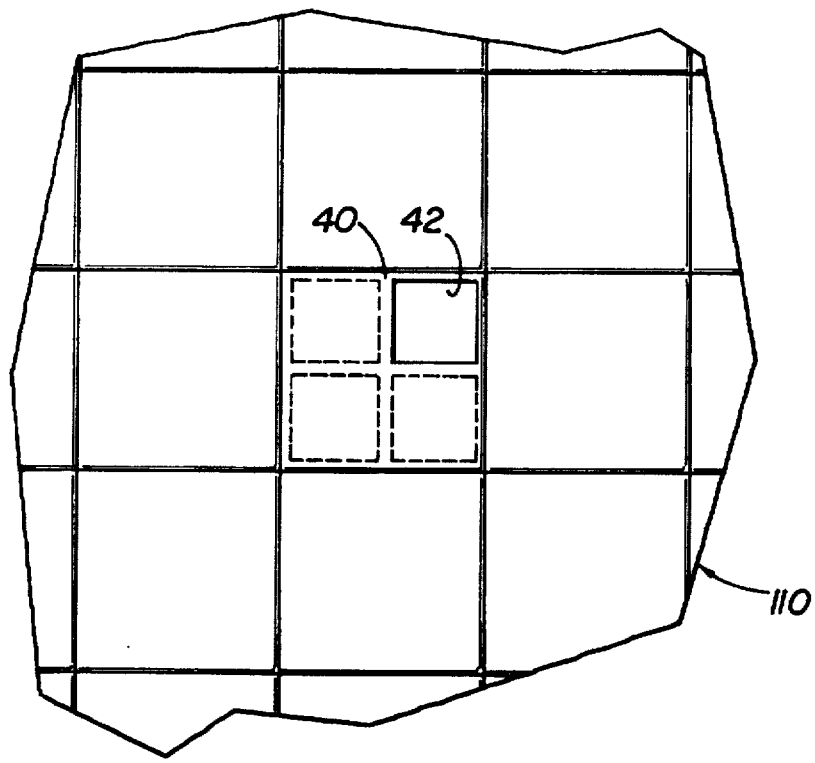
FIG 20
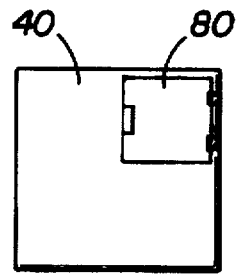 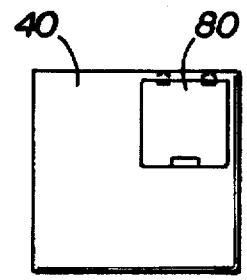
FIG 21A   FIG 21B
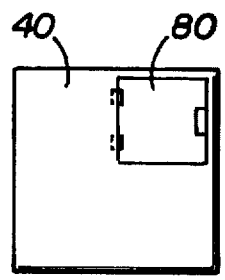 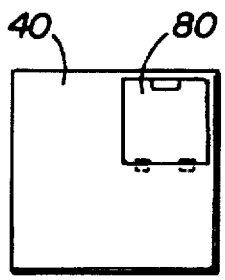
FIG 21C   FIG 21D

JUNCTION BOX FOR LOW PROFILE RAISED PANEL FLOORING

CROSS REFERENCE TO RELATED APPLICATIONS

This application is a continuation in part of co-pending application Ser. No. 08/294,441, filed on Aug. 23, 1994, which is a continuation in part of co-pending application Ser. No. 08/218,373, filed on Mar. 25, 1994, both of which applications are herein incorporated in their entirety by this reference.

BACKGROUND OF THE INVENTION

This invention relates generally to a junction box that organizes and provides access to electrical, data or telecommunications cables or other service lines that are routed through channels formed between a false floor that is supported above an existing floor.

Various flooring systems have been developed that are designed to provide spaces or channels between an existing floor and a false floor supported above the existing floor. The resulting channels are then used to carry various cables, wires, hoses, compressed air lines, power lines, phone lines or water pipes across the floor or to any point within the room. Most such false flooring systems were developed in response to the need for better organization and delivery of power, data and telecommunications cables needed for the plethora of different electronic equipment (e.g., computers, facsimile machines, telephones, modems, etc.) used in modern offices. By providing a false flooring system with multiple channels through which cables can travel, equipment within a room can be readily replaced or moved or new equipment added by accessing the channels within the false floor and removing, reorganizing or adding the appropriate cables.

Such false floors or raised panel floors typically utilize removable panels laid side-by-side upon raised support members in order to afford a free space where conduit, cables, hoses, wires and other computer interconnections can be routed. Many false flooring systems use adjustable jacks at each panel corner as a means of support. The support jacks for such systems are located only at the corners of the panels, which are usually square with sides of 500 to 600 mm. Accordingly, rigidity and mechanical stability of the floor must be achieved through the use of very thick panels, usually 30 to 40 mm thick, sometimes including a framework which transfers the load to the jacks. Due to the loss of usable height, these types of false flooring require an overall height of 150 to 200 mm, which is incompatible with low ceilings in existing buildings and requires new facilities to be built with added height. As an example, if one considers a 200 mm false floor at each level of a thirty-story building, the additional required height becomes six meters, the equivalent of two stories. Installing such a false floor in existing buildings requires the construction of ramps and steps as well as fire and soundproofing barriers. Finally, such structures are sometimes noisy and act as resonators. In any event, installing existing false floors as part of a building renovation or in new construction, is both involved and costly.

U.S. Pat. No. 5,052,157 to DuCroux, et al. (the "DuCroux patent"), incorporated herein in its entirety by this reference, describes a false flooring system that includes base plates with a fairly dense pattern of supports or stand-offs that support false floor plates while providing a network of channels through which cables, hoses and similar service delivery lines can be routed. This system solves many problems previously associated with false floors, including such problems as described above. In addition to forming the false flooring system taught by the DuCroux patent by heat forming or injection molding of a plastic compound such as polystyrene, polyethylene, polypropylene or ABS, an alternative, noncombustible material, such as metal, may be formed into the false floor system. Details and the resulting advantages of accomplishing such a construction are fully described in pending U.S. application Ser. No. 08/114,447, filed Aug. 31, 1993 for "Low Profile Raised Flooring With Metal Support Structure," incorporated herein in its entirety by this reference.

However, while much effort has been expended in developing false flooring systems, generally little innovation has been directed to providing an interface between the cables traveling within the channels underlying a false floor and the equipment that must be connected to cables traveling within those channels. For instance, the false flooring systems disclosed and claimed in U.S. Pat. No. 2,089,893 to Greulich, and U.S. Pat. No. 4,905,437 to Heather, each utilize a false floor panel supported by a plurality of projections between and through which cables can pass. A simple aperture, through which a cable can be pulled to connect either to an outlet fitted within the aperture or to a specific piece of equipment, is the only interface provided between the channels beneath and the equipment above the false floor. Such an approach may be appropriate when there are relatively few cables to deal with and skilled personnel are available to wire each electrical, data, telecommunication or other cable to the appropriate outlet or machine; however, a major motivation for using false floor systems has been the great number of cables and interconnections necessary for the various machines residing in the modern office and often used by technically untrained persons.

Other attempts at providing an interface between the office equipment disposed at various points about a false floor and the cables underlying the false flooring system have resulted in complex, difficult to install and/or move structures. For instance, U.S. Pat. No. 5,263,289 to Boyd discloses a box, which must be embedded into the structural floor, for providing service connection points. Additionally, U.S. Pat. No. 4,968,855 to Le Paillier discloses a "distribution slab" for wiring buildings. One embodiment illustrates a slab in which the outlets face upwards, thus requiring that spacing within the channels created between the base and lids be increased where bulky connection devices or plugs will be utilized. Another embodiment places outlets within one or more lids that can be raised or lowered. When the lid is lowered the outlets are inaccessible; however, when it is raised, while accessible, outlets are exposed to the environment and the raised lid and outlet becomes a hazard to those traveling the false floor.

Much like the Le Paillier "distribution slab," U.S. Pat. No. 5,057,647 to Bogden, et al., discloses a "distribution block" that inserts into one of four compatibly shaped knockouts disposed in each corner of a floor plate. Once the appropriate knockout is removed, the distribution block inserts into the knockout and connects with modular electrical "whips" composed of electrical wires and end connectors. Electrical socket outlets and a cover plate are then fixed into the distribution block so that the outlets are exposed. Because the knockouts are formed in flooring plates through perforations, once the perforations are ruptured and the knockout plate removed, there is no means for replacing the knockout. Accordingly, in order to change the position of an already installed distribution block, not only must the block be laboriously unfastened, but the entire floor panel would need to be removed and replaced.

SUMMARY OF THE INVENTION

The junction box of the present invention may include a housing with four sides joined to form a square, with receptacles provided for outlets. The housing may be formed from sheet steel or other appropriate material so as to be held in place by contact with stand-offs. A hatch accesses the outlets within the housing. The junction box acts as an interface between (1) the electrical, telecommunication, data or other service lines traveling through channels formed beneath a false floor and (2) the equipment resting upon the false floor that must connect to the correct service line. Various outlets within the junction box may be provided for electrical, telecommunication or data transmission lines of the flush or forward type or may be pierced with holes for passage of lines through the junction box directly to a specific piece of equipment.

Installation of the cable junction box is accomplished without the necessity for fastening means, such as screws, adhesive or clamps, as the housing of the junction box is shaped to fit tightly between the posts or stand-offs which support the false floor plates above the structural floor. The housing can be comprised of a single unit or several pieces assembled into various shapes, preferably a square, all of which fit tightly between the stand-offs supporting a false floor. No special fasteners or other attachment means need be used, as frictional contact between cutouts in a flange or ledge running along the top of the housing and stand-offs will fix the housing in place. Utilizing a housing of this construction, a junction box can be placed at virtually any point in the area covered by a false floor. Accordingly, not only is flexibility of position greatly enhanced, but the junction box readily can be concealed in less traveled areas (e.g., underneath equipment or furniture), yet be conveniently close to equipment so that ready access to outlets within the junction box is provided.

Another embodiment of the junction box utilizes a housing that has a flange with holes through which stand-offs may insert in order to hold the housing even more firmly in place. Protective guards connect to the flange to form a bracket which has one leg attached to a side wall while the other leg is capable of abutting against the surface upon which the housing rests. Together, the guard, flange and side wall form a trough or passage through which cables may be routed to openings at each end of the passage or to openings in the guard that may be formed by punching out preformed reliefs. Additionally, because the back of the outlet will project into the passage, it is isolated from accidental contact or breakage by users, installers or personnel servicing or rearranging the cables that are attached to cable connectors secured within the junction box. The housing of the junction box can be formed by stamping and folding sheet steel or other material as appropriate, as an extrusion of either galvanized steel or, because of the additional support provided by the protective skirt and flange, synthetics material.

Once a housing is established between the desired stand-offs, a flooring plate with an appropriately located and sized aperture is selected so that the outlets within a housing are accessible to persons desiring to connect office or other equipment to an outlet. Not only may virtually any grouping of stand-offs be selected to locate the housing, but because a floor plate having an aperture located in various positions can be supplied, a junction box may be placed and accessed on virtually any point of a false floor. Moreover, upon rearrangement of equipment disposed about the false floor, the cables, which are provided with extra length, are left connected to the outlets within the housing of the junction box while the entire Junction box, including the housing and access floor plate, is moved to a new location. The cables may then be rerouted through the channels within the false floor to the new location. Alternatively, the cables readily may be disconnected from the outlets while the junction box is moved to a new location, with either the same or new cables reconnected to the outlets.

Typically, electrical or other components to which cables connect are often of different sizes, depending either on the type of component or the component supplier. Rather than customizing each housing to accept each type of component, the sides of the housing may include a plurality of standard notches. Frames, formed of plastic or some other, preferably dielectric, material may then be used with particular components or with particular suppliers' components. Each frame has edges into which are machined grooves that each accept the edge of the notch to thereby hold the frame within the housing. The correctly sized cutout for the particular component can be machined into the frames. A variety of frames with different sized component openings can be provided as an installation package to the installer, who will select the proper frame, snap the desired component into place in the frame and slide the frame into the proper notch or hole in the housing. Thus, it is possible with the relatively inexpensive, slide in frames to outfit the junction box with virtually any component demanded by a particular client. Additionally, because the frames may be formed of synthetics materials, any electrical components are isolated from the metallic housing and/or metallic false flooring system, which eliminates the need to ground the junction box.

An additional feature of the present invention is a hatch shaped to cover the access aperture within the floor plate, thereby ensuring foreign objects do not enter the junction box, possibly to damage the outlets or cables within, while preventing the junction box from becoming a hazard to persons or objects traveling upon the false floor. Moreover, the hatch can be covered with the same carpet or other covering that is used on the flooring plates, thus concealing better the junction box from passers by. A small cable protector in the hatch allows it to be fully closed while still providing an egress for one or more cables entering the junction box and connecting to the outlets.

Although designed for use with any of the flooring systems disclosed in U.S. Pat. No. 5,052,157, pending Reissue application Ser. No. 08/110,656, pending patent application Ser. No. 08/114,447, and pending patent application Ser. No. 08/294,441, which documents are each hereby incorporated herein in their entirety by these references, the present invention can also be adapted for use with other false flooring systems that make use of a plurality of stand-offs to support various floor panels (e.g., U.S. Pat. No. 4,905,437 to Heather) or even upon other appropriate surfaces such as walls. Thus, junction boxes according to this invention may be fabricated to match the heights and shapes of the posts which support the false floor in which the junction box is used or to fit between the studs in a wall. Additionally, junction boxes can be fabricated to the length and shape required to engage with the desired number of posts to obtain thereby the desired size of junction box. More or fewer outlets can be provided within a junction box depending on the number of cables needed to be organized and accessed.

It is therefore an object of the present invention to provide an economical, simple-to-use junction box that interfaces with cables traveling under a false floor and equipment placed at various points about the false floor.

It is another object of the present invention to provide an easily installable junction box that can be placed at virtually any point on a false floor without the need for extensive connection methods or attachment systems.

It is yet another object of the present invention to provide a floor plate with an aperture through which the junction box is accessible regardless of its location in the false floor.

It is a further object of the present invention to provide a hatch to cover and protect the junction box and outlets within it from entry of foreign objects while decreasing the hazard that an otherwise open aperture would offer.

It is an additional object of the present invention to provide a cable protector that will allow the hatch to be closed while still providing an abrasion-free entry for cables that must be connected to the outlets within the junction box.

It is yet a further object of the present invention to provide a variety of frames that can be used to hold different sized components connecting to the cables and that can easily slide into any one of a plurality of standard sized holes formed in the housing sides.

It is an added object of the present invention to form the frames from a dielectric material in order to isolate electrically the components from the housing of the junction box.

It is yet an additional object of the present invention to provide a flange through which stand-offs can project in order that the flange encircles the stand-offs completely to provide increased stability to the junction box.

It is yet another object of the present invention to provide a protective guard that prevents contact with the components connecting to the cables by forming a channel into which projects portions of the components and through which cables can be routed.

Other objects, features and advantages of the present invention will become apparent with reference to the remainder of the text and the drawings of this application.

BRIEF DESCRIPTION OF THE DRAWINGS

FIG. 4 is an exploded perspective view of a raised panel flooring system used with the present invention showing the floor panels exploded away from two assembled base plate and stand-offs units lying on a floor.

FIG. 20 is a top plan view of a false flooring system showing various positions within a single floor plate in which an aperture that provides access to a junction box can be defined.

FIGS. 21A-D are top plan views of various positions in which a hatch can be fitted into an aperture in a floor plate.

DETAILED DESCRIPTION OF THE DRAWINGS

Figure 1:
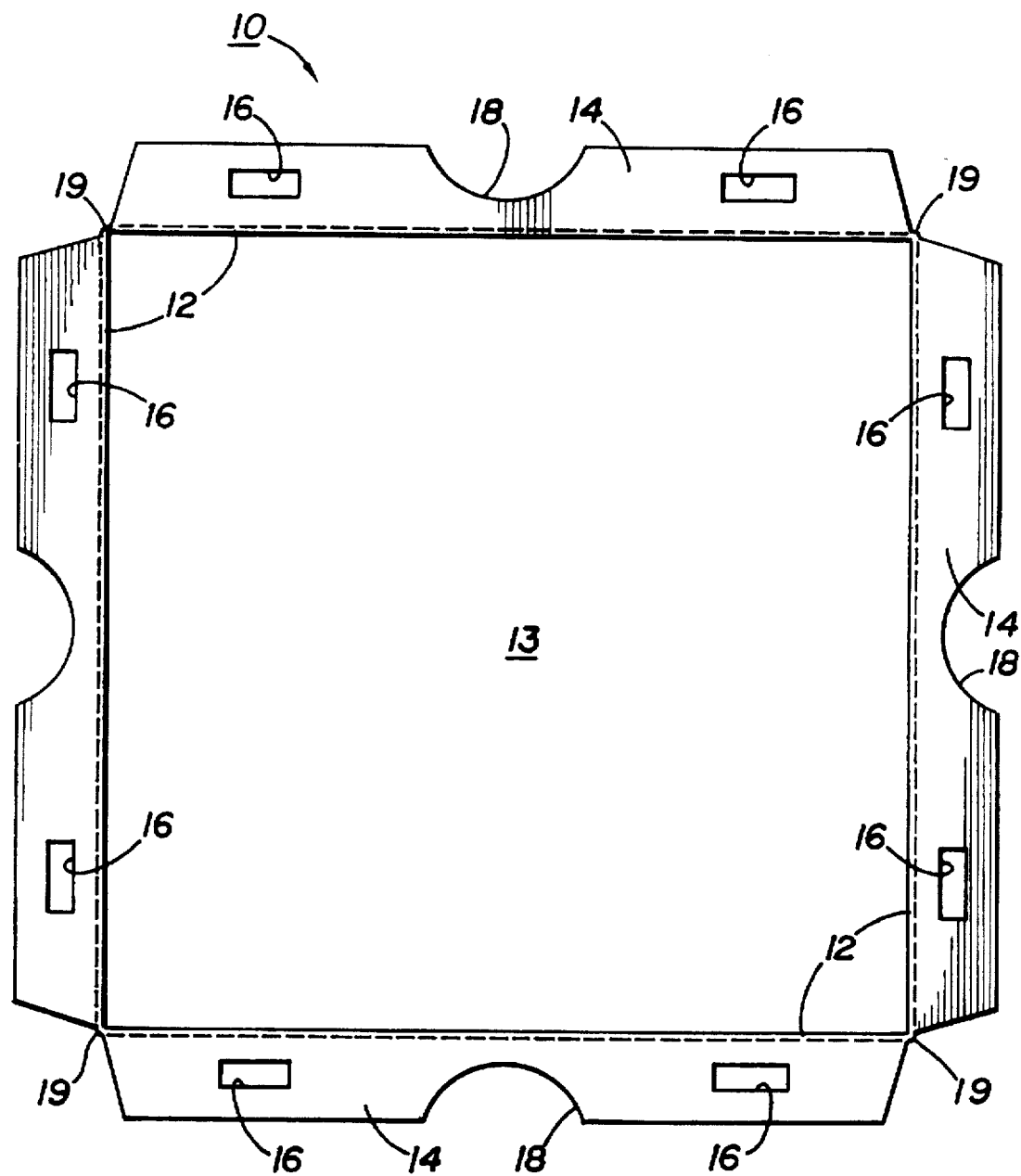
FIG. 1 is a plan view of a square housing for a junction box of the present invention.
Figure 2:
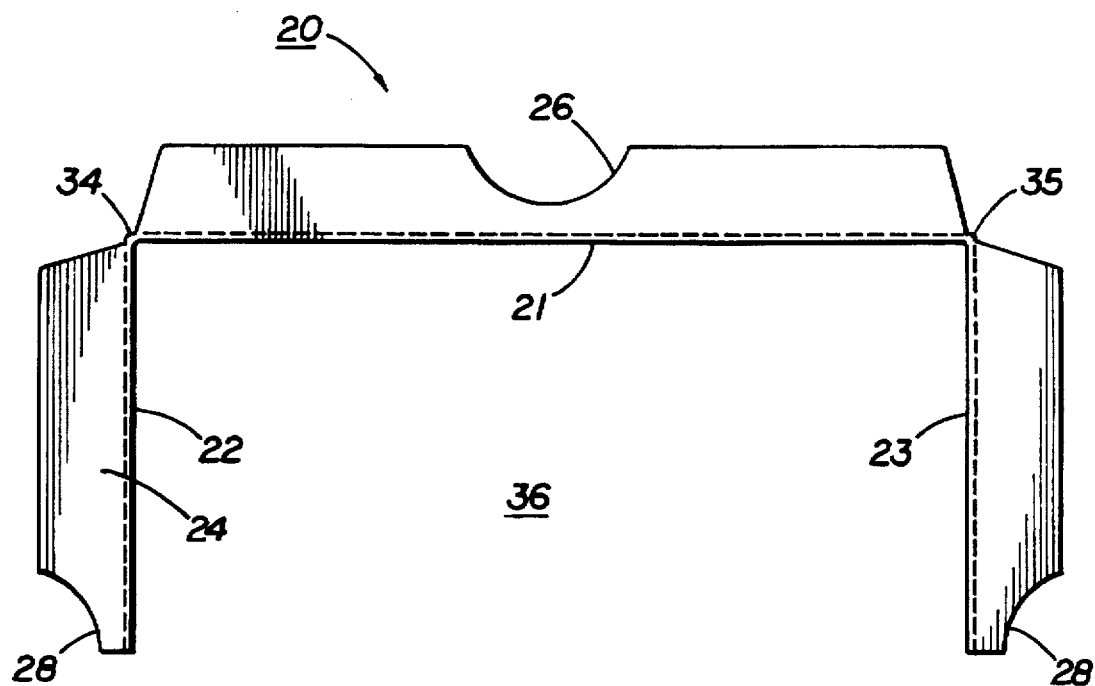
FIG. 2 is a plan view of an alternative housing for a junction box of the present invention.
Figure 3:
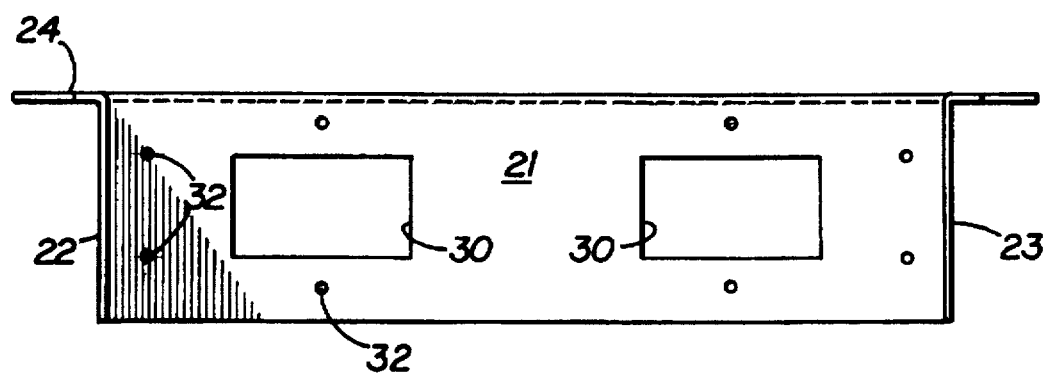
FIG. 3 is a side elevation view taken along lines 2—2 in FIG. 2.

As shown in FIG. 1, housing 10 is composed of four sides 12 meeting in 90° angles at corners 19 to form a square perimeter bounding open area 13. Each of sides 12 has a top ledge 14 in which two rectangular holes 16 and a semicircular cut-out 18 are defined. Housing 10 may be formed by stamping or otherwise forming an appropriate material, such as sheet steel, so that two of sides 12 can be spot welded or otherwise fastened together at one of the corners 19, with the other corners 19 simply comprising, and the ledges 14 being formed by, bends in the material from which housing 10 is formed. Conversely, alternative housing 20, shown in FIGS. 2 and 3, is formed simply by bending or forming some appropriate material at each of corners 34, 35. Housing 20 has an open perimeter defined by base 21 joined at right angles to one end each of sides 22, 23, with an open space 36 partially bounded between base 21 and sides 22, 23. Semicircular cut-out 26 is formed in the perimeter of ledge 24 on base 21, and quarter cut-outs 28 are formed at each non-joined end of legs 22, 23. Housing 20 also has outlet openings 30 surrounded by holes 32, which are provided so that an appropriate electrical, telecommunication or other outlet can be secured to outlet openings 30, with the female end of the outlet facing towards open space 36.

As shown in FIG. 4, base plates 52 are adapted to be placed on an existing floor F. Fasteners such as nails 54 can be used to penetrate floor F through openings 56 and thereby secure base plates 52 to the floor F. In use, base plates 52 are typically laid side-by-side in a rectilinear pattern throughout the area of existing floor F, further minimizing the possibility that one base plate 52 will shift relative to the others. Base plate 52 may additionally be weakened to facilitate its division into multiple portions. FIG. 4 illustrates perforations 58 bisecting length L of base plate 52, for example, as well as scoring 60 for separating a pair of stand-offs 50 from the remainder of base plate 52. Base plate 52 and its stand-offs 50 may be a one-piece construction, formed by heat-forming or injection molding of a plastic compound such as polystyrene, polyethylene, polypropylene or ABS. Alternatively, base plates 52 could be formed from sheet metal or some other noncombustible material. As illustrated by FIG. 4, nothing precludes base plates 52 and stand-offs 50 being fabricated from separate modular pieces and fixed together. Moreover, to improve the grounding capability of system 110, some embodiments of base plate 52 include metal tabs 60 extending beyond the edges of the base plate 52 and on which adjacent base plates 52 may be placed.

Eight stand-offs 50, upon which floor plate 40 will rest and be secured, rise from each base plate 52. Stand-offs 50 are located in parallel rows about the base plates 52 so as to form a series of parallel channels perpendicular to each other. Greater or fewer stand-offs 50 may be contained on a base plate 52 and the spacing of stand-offs 50 may be modified as necessary or desired. A continuous lip 46 runs about the perimeter of floor plate 40 and may interlock with the top of a stand-off 50, as in FIG. 4. Holes 44, through which screws 48 pass to secure with bore 47 in stand-offs 50, are defined at each corner of floor plate 40 and further ensure that floor plate 40 is firmly secured to stand-offs 50. Floor plate 40 may be made of sheet metal, such as galvanized steel, plastic or any other appropriate material, which may then have attached sound absorbent or fire retardant material 49.

Figure 6:
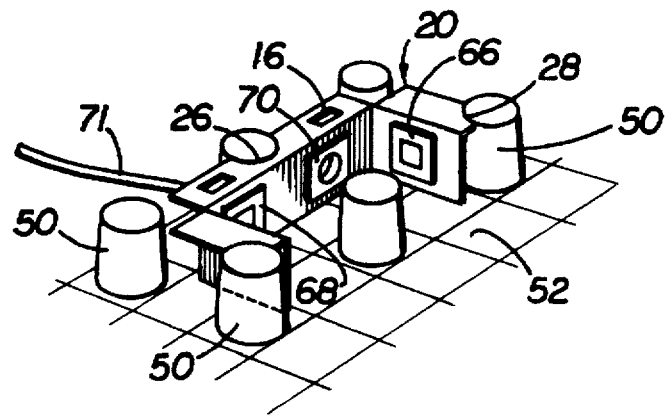
FIG. 6 is a perspective view of the second embodiment of the invention shown in FIGS. 2-3, shown with outlets and fixed between the stand-offs of a false flooring system.

To position properly a housing, for instance, housing 20, upon a floor covered with base plates 52 bearing stand-offs 50, as shown in FIG. 6, housing 20 is inserted between the selected stand-offs 50 so that each of cut-outs 26, 28 contact with the top of a stand-off 50. Other fastening systems, such as a notch in the top of a stand-off 50 for engaging with ledge 24 or adhesive, could be used to secure housing 20. Before being secured between stand-offs 50, housing 20 may be provided with telecommunications outlet 66, data communications outlet 68 and electrical outlet 70, with the female end of each facing space 36 formed between base 21 and sides 22, 23 of housing 20. Appropriate cables, such as data communications cable 71, are then attached to a corresponding outlet 66, 68 or 70.

Figure 7:
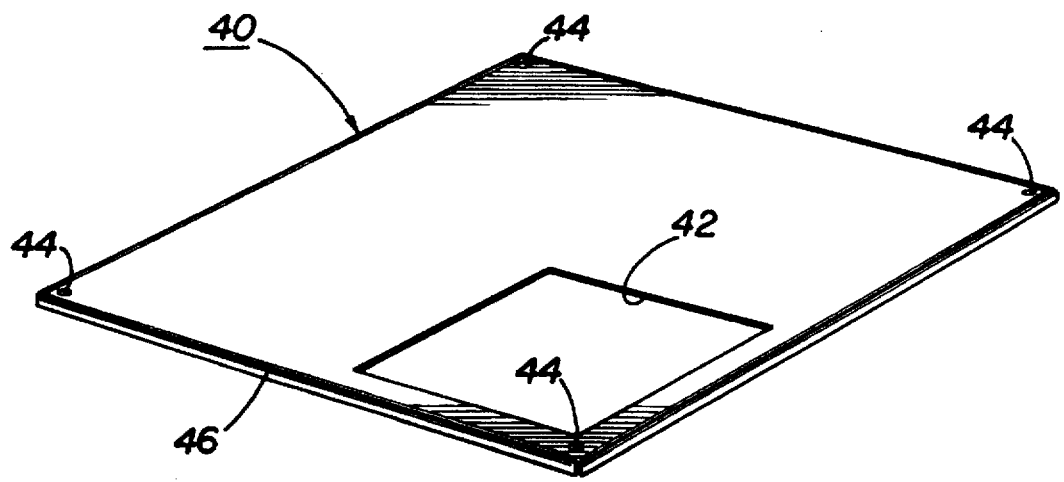
FIG. 7 is a perspective view of a floor plate with an aperture designed to provide access to a housing.
Figure 5:
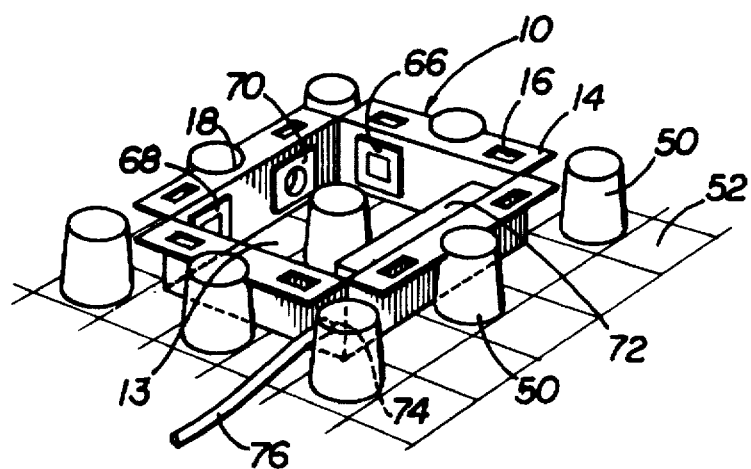
FIG. 5 is a perspective view of the first embodiment of the invention shown in FIG. 1, shown with outlets and fixed between the stand-offs of a false flooring system.

Should more outlets be necessary, housing 10 can be inserted between a different group of stand-offs 50, as in FIG. 5. Housing 10 is provided not only with outlets 66, 68 and 70, but may also be provided with outlet 72, which attaches to the interior of housing 10. Each of the outlets 66, 68, 70 and 72 faces towards space 13 in the middle of square housing 10, which space 13 will be accessible through an aperture 42 defined in floor plate 40 illustrated in FIG. 7, so that electrical or other equipment may be connected to any of the outlets.

Figure 8:
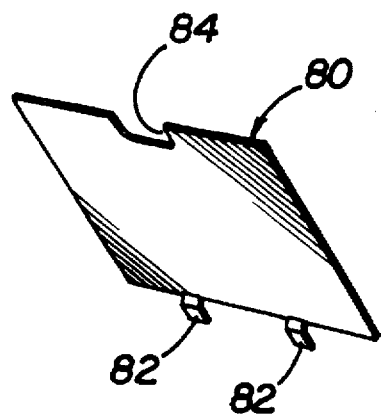
FIG. 8 is a perspective view of one embodiment of a hatch used to cover the aperture within a floor plate.
Figure 9:
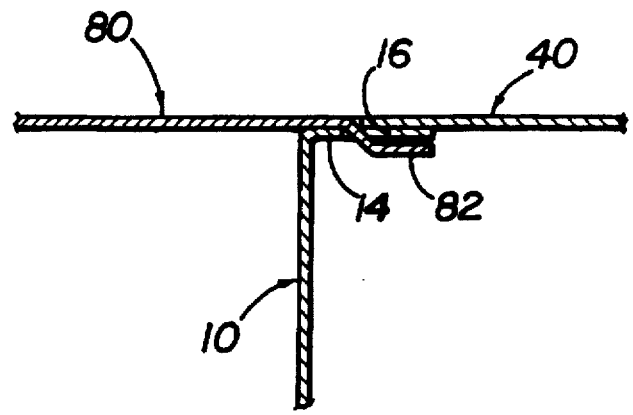
FIG. 9 is a partial side elevation view of a section through lines 3—3 in FIG. 8.
Figure 10:
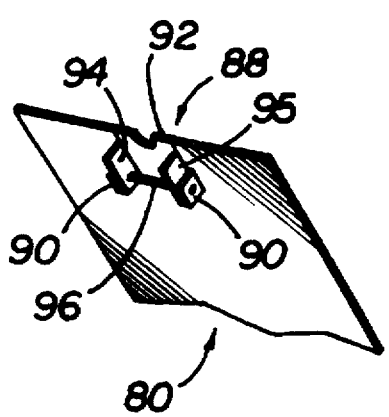
FIG. 10 is a partial perspective view of a second embodiment of a hatch with a cable protector.
Figure 11:
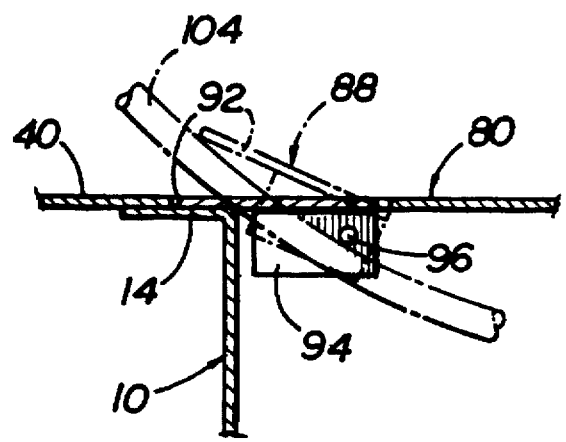
FIG. 11 is a partial side elevation view of a section through lines 4—4 in FIG. 10.

FIG. 8 illustrates one embodiment of a hatch 80 that covers aperture 42 and upon which are formed tabs 82 and a cable opening 84. Tabs 82 insert into holes 16 in the housing 10 so that the perimeter of hatch 80 fills substantially aperture 42. Although tabs 82 alone may support the weight of hatch 80, preferably the end of hatch 80 in which cable opening 84 is defined, rests upon ledge 14 of housing 10, as best shown in FIG 9. Cable protector 88, shown in FIG. 10, may be provided for hatch 80. Clips 90 depend from hatch 80 and define holes through which a pin or a rod 96 may be inserted to hold cable protector 88 within cable opening 84. A cover 92 has arms 94, 95 for attachment to clips 90. Arm 94 is slightly longer than arm 95 and will contact the underside of hatch 80 in order to prevent cover 92 from rotating below the plane of hatch 80. In addition to connecting cover 92 to clips 90, arms 94 and 95 act to protect cable 104 from being abraded through contact with cable opening 84. Cable protector 88 may rotate upwards around rod 96 when hatch 80 is in the closed position so as to provide access for cable 104, as illustrated in FIG. 11.

Figure 12:
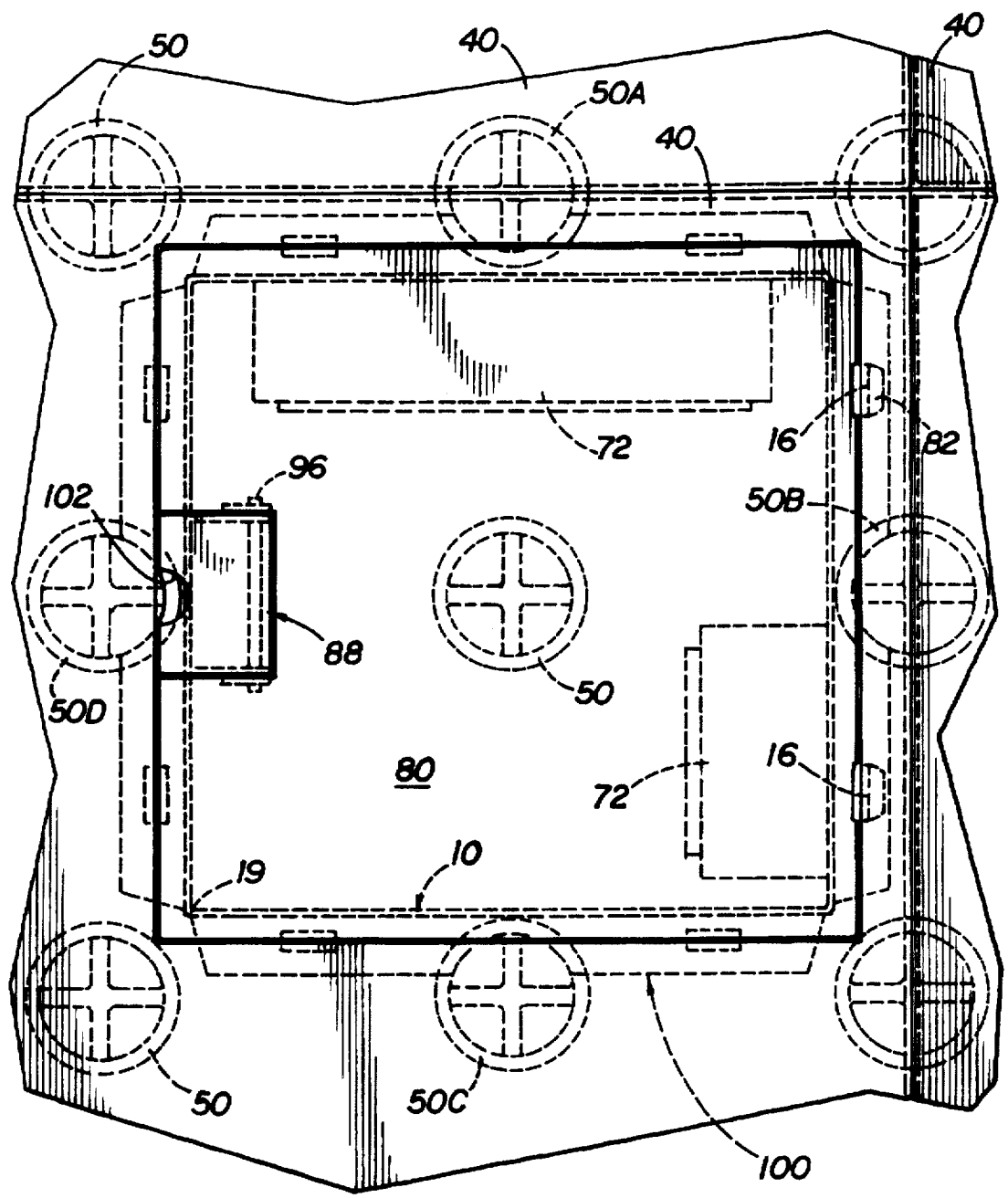
FIG. 12 is a top plan view of the embodiment of the junction box of the present invention shown in FIG. 1.

Junction box 100 of the present invention is shown in FIG. 12. Housing 10 is situated between four stand-offs 50, labeled clockwise from top center, I, II, III and IV, respectively. Cutouts 18 engage the top of each stand-off I, II, III and IV with other stand-offs 50 situated about each corner 19 of housing 10. Within housing 10 are disposed various outlets 72 which may interface with electrical, data, telecommunications or other service delivery lines. The outlets 72 are accessed through aperture 42 situated in the upper right-hand corner of a floor plate 40. Aperture 42 is covered by hatch 80 whose tabs 82 insert into square holes 16 on housing 10 and provide the means by which hatch 80 is releasably secured to housing 10. The junction box 100 is illustrated with hatch 80 closed and no cables passing through cable protector 88, which is provided with a semicircular notch 102 that allows the cable protector 88 easily to be opened so that the hatch 80 can then be lifted upwards or cable be passed through cable opening 84.

Note that another, smaller housing could be fitted between stand-offs I, II, III and IV so that each corner of the housing would contact one of each stand-off I, II, III and IV. Such a housing, observed through an open hatch 80, would be in the shape of a diamond. Other shapes and sizes of housings can be used with stand-offs 50. Moreover, the present invention could be modified to fit between stand-offs shaped or spaced differently than those discussed herein.

Figure 13:
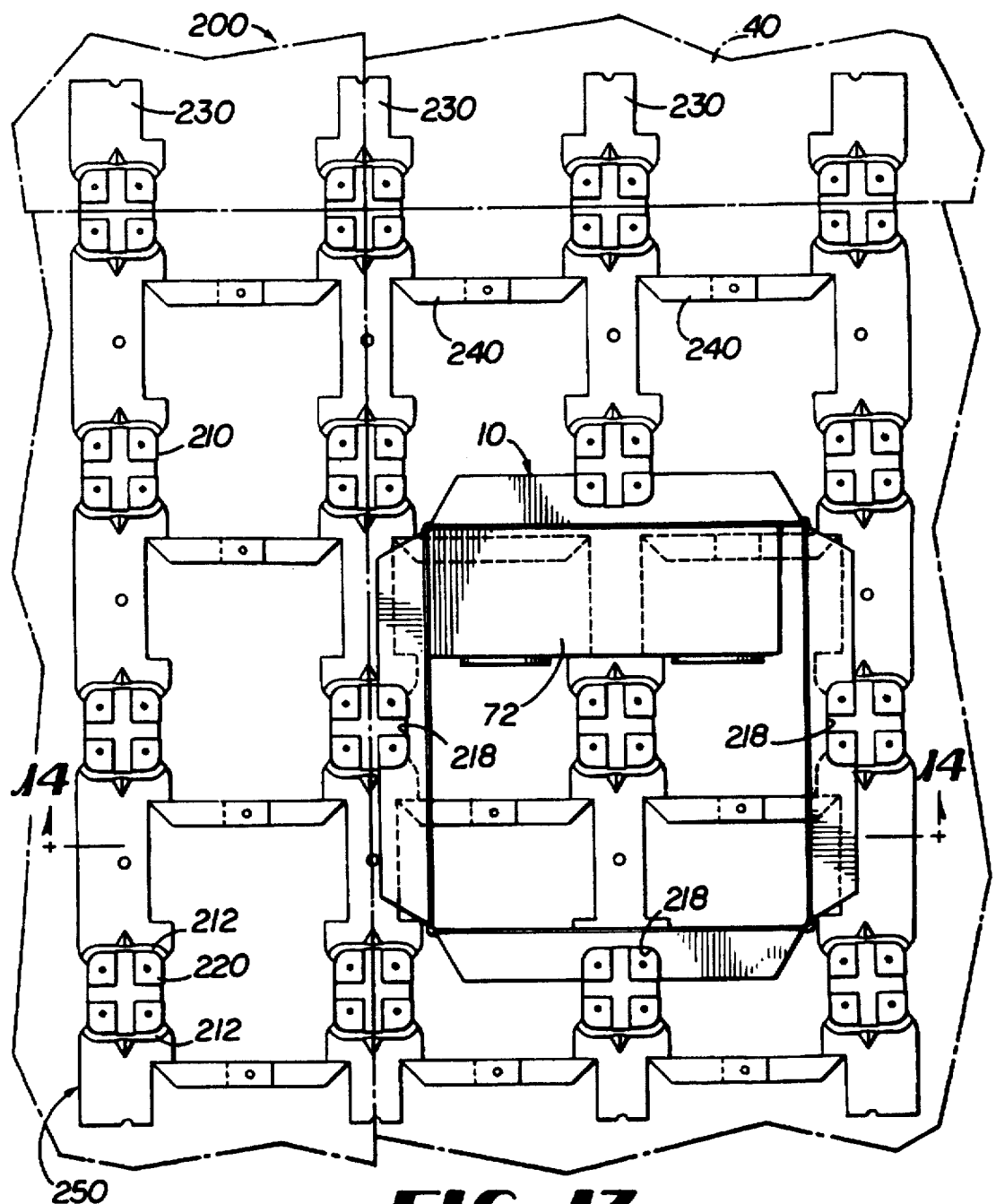
FIG. 13 is a top plan view of another embodiment of a false flooring system provided with a junction box of the embodiment shown in FIG. 1.
Figure 14:
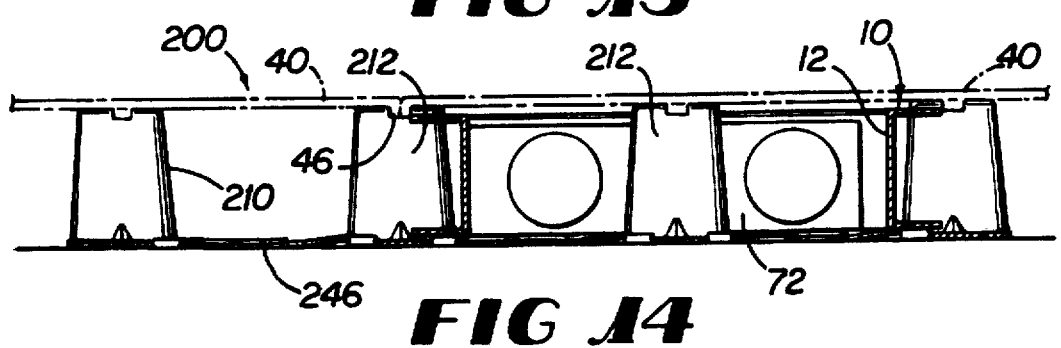
FIG. 14 is a side elevation view of a section through lines 5—5 in FIG. 13.

For instance, FIGS. 13 and 14 show the housing 10 of the present invention used with the false flooring system 200, which is described in detail in co-pending application Ser. No. 08/294,441. Flooring system 200 utilizes strips of sheet metal, typically galvanized steel, from which are formed support pedestals 210 that remain connected by the strip 230. Each of the pedestals 210 has two legs 212 connecting a central section 220 to a connecting strip 230. Transversely extending from the strip 230 of pedestals 210 are wings 240 (also formed from the strip 230) that are designed to interlock with wings 240 of other strips 230 bearing pedestals 210. Interconnecting a plurality of pedestal-bearing strips 230 together, for instance by connecting wings 240 via staples 246, forms a module 250 having a rectilinear, grid-like pattern of pedestals 210 connected via strips 230 and wings 240. Numerous modules 250 can be placed over and fixed to a floor. Floor plates 40 are then placed over the pedestals 210 and the housing 10 is situated between several pedestals 210 of a module 250 so that the cut-outs 218, which are generally trough-shaped, contact with the top of a pedestal 210 to hold the housing 10 in the selected position.

Secured within junction box 100 in one of the sides 12 is an outlet 72 that may interface with electrical, data, telecommunications or other service delivery lines traveling through the channels defined by the floor plates 40, the floor F and the pedestals 210. Such lines could also travel between any pair of supporting legs 212 of the pedestals 210 in order to reach the junction box 100, which serves as a distribution center to which equipment scattered about the top of the floor plates 40 can interface for power or other services. Outlet 72 may be accessed through an aperture, optionally provided a hatch 80, situated in a floor plate 40.

Figure 15:
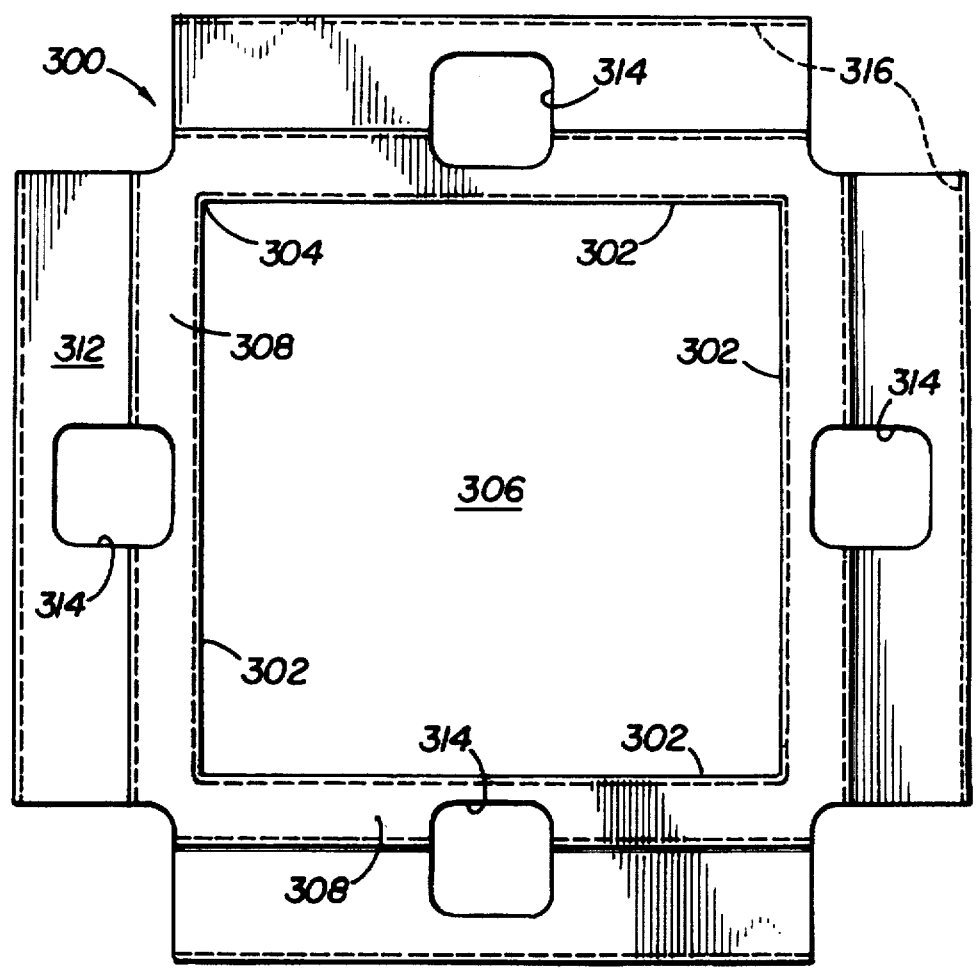
FIG. 15 is a top plan view of a third alternative embodiment of the junction box of the present invention.
Figure 16:
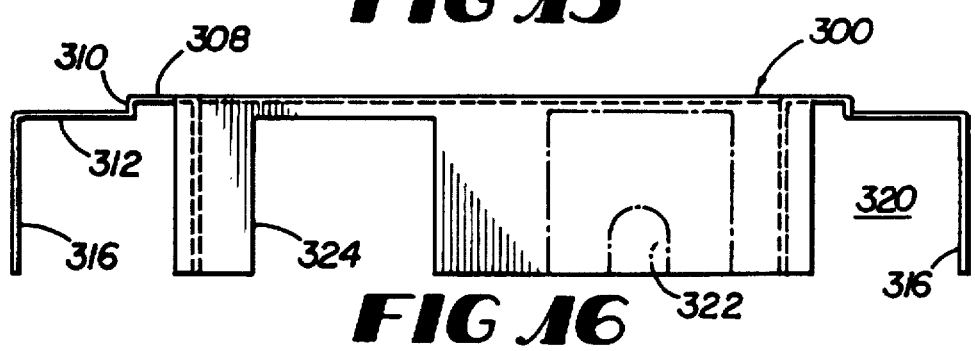
FIG. 16 is a side elevation view of a section through lines 6—6 in FIG. 15.

An alternative embodiment of a housing 300 is shown in FIGS. 15 and 16. Housing 300 is composed of four sides 302 meeting in 90° angles at corners 304 to form a square perimeter bounding open area 306. Each of sides 302 has a top flange 308 that drops down at step 310 to form a shelf 312. Four holes 314 are defined in the flange 308 and shelf 312. Although holes 314 are generally rectangular, they can be of any shape that will allow a stand-off, pedestal or other support to insert through the holes 314 and hold the housing 300. Skirts 316 connect to the far end of the shelf 312 and are generally parallel to and the same height as each opposing side wall 302. Housing 300 may be formed by stamping or otherwise forming an appropriate material, such as sheet steel, so that two of the sides 302 can be spot welded or otherwise fastened together at one of the corners 304. Housing 300 may also be formed as an extrusion of any suitable material, including plastics or metal materials.

Figure 17A:
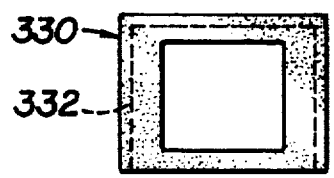
FIGS. 17A-B are front and side views, respectively, of a slide in frame for use with a junction box.
Figure 17B:

Each corresponding pair of skirts 316 and side walls 302 form a passage 320 that is accessible at each end, as perhaps best seen in FIG. 16. Cable 328 travels through these ends or a preformed relief 322 that can be punched out to form an opening. Cable 328 is connected to an outlet 336 that may be inserted in a frame 330 shown in FIGS. 17A–B. Frame 330 is sized to fit within the notch 324 and has a groove 332 running along three sides of the frame 330. When the frame 330 is slid into place, groove 332 accepts the edge of the notch 324 in order to seat the frame 330 in the notch 324 via the resulting tongue and groove joint.

Figure 18:
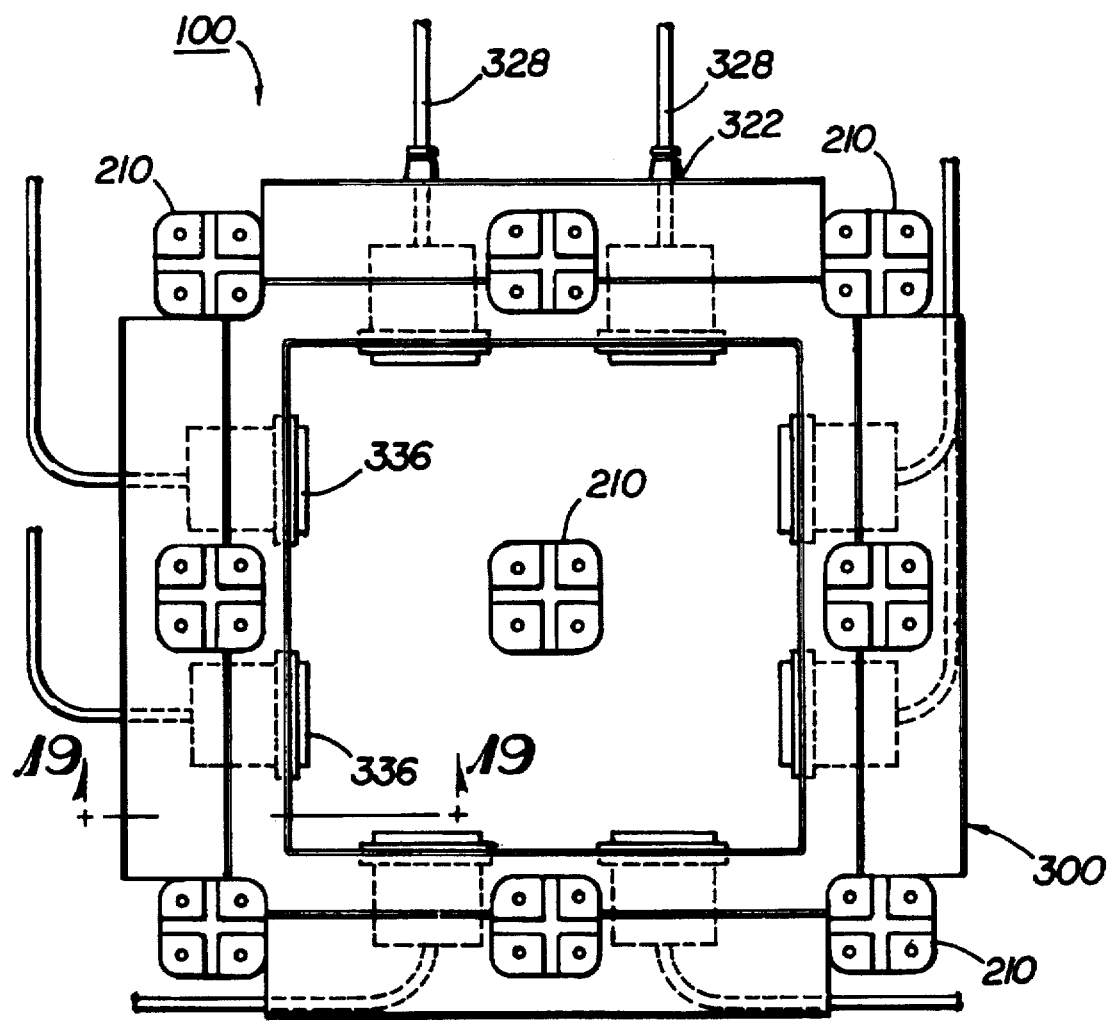
FIG. 18 is a top plan view of the third embodiment of the junction box shown in FIGS. 15 and 16, provided with the frames of FIGS. 17A-B and deployed in the false flooring system shown in FIG. 13.
Figure 19:
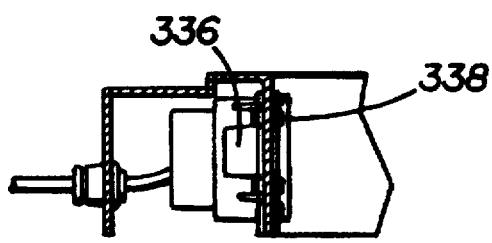
FIG. 19 is a side elevation view of a section through lines 7—7 in FIG. 18.

Electrical or other components or cable connection means, such as the outlets 336, in the junction box 100 that utilizes the housing 300 and which is shown in FIGS. 18 and 19, may be easily attached to the central opening 334 of the frame 330. Such attachment can occur by, for instance, providing the outlet 336 with flexible prongs 338 that bend when the outlet 336 is inserted into the opening 334 in order to allow insertion, then flex back to their original position to hold the outlet 336 within the opening 334. Numerous frames 330 with different sized openings 334 may be formed of an inexpensive plastics type material and provided to installers of the housing 300. For example, instead of the generally rectangular opening shown in FIG. 17A, the opening 334 could be a smaller rectangle or two adjacent rectangles that are capable of accepting telephone jacks. Frames 330 with the different sized openings 334 allow easy installation of virtually any type of component, whether electrical outlet, data communication outlet or telephone jack, regardless of whether the same components are produced by different manufacturers. Frames 330 save significantly on installation time, and thus labor cost, since the installer need only snap the chosen outlet 336 into the correct frame 330, slide each such assembled frame 330 into the notch 324 in the housing 300, and then place the housing among the pedestals 210, as shown in FIG. 18. Once the housing 300 is in place amongst the selected pedestals 210, a floor plate 40 can be placed upon the pedestals 210. Step 310 allows the lip 46 of a floor plate 40 to overlap the step 310 and abut against the shelf 312, which will provide further support and stability to the floor plate 40.

Frames may also be used with the housings 10 or 20 by providing snap-locking tabs on the outer edges of the frames. The tabs would hold the frames within the generally rectangular openings 30 of the housings 10 or 20. Alternatively, the housings 10 or 20 could be modified to accept the frames 330 by simply snipping away the portion of the housing 10 located beneath the opening 30 to form a notch 324 that readily accepts a frame 330. If the frames 330 are formed of a good dielectric material, any electrical components will be isolated from the junction box housing. Such isolation eliminates the need for grounding the housing and allows compliance with various standards, such as European installation standards IP 2.4 and 7.

FIGS. 20 and 21 further illustrate the versatility in positioning offered by the junction box 100 of the present invention. A false flooring system 110 is shown in FIG. 20 with a floor plate 40 having an aperture 42 that can be placed in any corner of the floor plate 40. Of course, aperture 42 need not be square but may be any appropriate shape and could be positioned in areas other than the corners, so long as at least part of the space within a housing can be accessed through the aperture 42. Not only can the aperture 42 be placed virtually anywhere upon a floor plate 40, but as shown in FIGS. 21A–D, hatch 80 can be positioned with the cable protector opening facing any one side of aperture 42. Thus, a junction box 100 of the present invention can be located virtually anywhere upon false flooring system 110 and provided with a hatch facing any direction so that any outlets within the junction box 100 are accessible for connection to equipment disposed about false flooring system 110.

While the junction boxes disclosed are generally used with false flooring systems, they are readily adaptable for use in virtually any area that needs a device for organizing and interfacing with a variety of cables, wiring or even plumbing. For instance, the housing 300 could be readily modified to be secured between studs within a wall or to accept plumbing outlets. Frames 330 could then be used to install, with substantial labor savings, numerous outlets within a wall junction box capable of organizing numerous cables and other wiring. Such a system would not only be easier to install than existing systems, it also would be easier to modify since the service personnel need merely remove the frame in order to remove an outlet and disconnect a cable for rerouting.

The foregoing is provided for purposes of illustrating, explaining and describing several embodiments of the present invention. Modifications and adaptations to these embodiments will be apparent to those of ordinary skill in the art and may be made without departing from the scope or spirit of the invention and the following claims.

What is claimed is:

1. A junction box combined with a flooring system, the junction box comprising:
    (a) a plurality of sides joined to form a housing;
    (b) a flange attached to at least one of the plurality of sides;
    (c) a skirt depending from the flange and located adjacent the at least one side in order to form a passage between the skirt and the side;
    (d) a notch in the at least one side; and
    (e) means for securing an outlet within the notch.

2. The combination according to claim 1 in which the housing is positioned within a false flooring system comprising a plurality of base plates for positioning on a floor and from each of which a plurality of stand-offs extend to support floor plates, whereby channels through which cables may travel are formed by the stand-offs, base plates and floor plates.

3. The combination according to claim 1 in which the flange comprises means for holding the housing in a selected position by contact with a plurality of stand-offs.

4. The combination according to claim 1 in which the flooring system comprises a plurality of supports for a floor plate, which comprises an opening through which the outlet within the housing may be accessed and a hatch shaped to fit the opening and comprising:
    (a) means for releasably securing the hatch over the opening; and (b) means for providing access through the hatch to the housing.

5. The combination according to claim 1 in which the housing is positioned within a false flooring system comprising a plurality of interconnected strips in which are formed pedestals that support floor panels.

6. The combination according to claim 5 in which the flange comprises means for at least partially contacting with the pedestals in order to fix the housing in place.

7. A junction box comprising:
   (a) a plurality of sides joined to form a housing;
   (b) a flange attached to at least one of the plurality of sides;
   (c) a skirt depending from the flange and located adjacent the at least one side in order to form a passage between the skirt and the at least one side;
   (d) a notch in the at least one side; and
   (e) means for securing an outlet within the notch.

8. A junction box for attachment to a surface comprising:
   (a) a housing defining a plurality of side walls, wherein at least one of the plurality of side walls defines a notch; and
   (b) a frame, comprising a central aperture capable of accepting a cable connector means, for insertion into the notch.

9. A junction box according to claim 8 further comprising a flange attached to at least one of the plurality of side walls.

10. A junction box according to claim 9 in which the flange is formed to at least partially contact a plurality of supports in order to fix the housing in place.

11. A junction box according to claim 8 further comprising a bracket having a first leg that connects to at least one of the plurality of side walls and a second leg that runs parallel to the at least one side wall to form a trough.

12. A junction box according to claim 8 further comprising means for securing the junction box within a false flooring system.

13. A combination of a junction box and a false flooring system into which the junction box is positioned, in which the junction box comprises:
   (a) a housing defining a plurality of side walls, wherein at least one of the plurality of side walls defines a notch; and
   (b) a frame, comprising a central aperture capable of accepting a cable connector means, for insertion into the notch.

14. The combination according to claim 13 in which the false flooring system comprises supports that are attached to a base plate that secures to a floor and each support is capable of engaging a floor panel to thereby form the false flooring system and in which the housing further comprises a flange formed to at least partially contact a group of the supports in order to fix the housing in place.

15. The combination according to claim 13 in which the false flooring system comprises:
   (a) a plurality of strips in which are formed pedestals;
   (b) means for connecting the strips; and
   (c) a floor panel supported by the pedestals.

16. The combination according to claim 13 in which the false flooring system comprises:
   (a) a floor plate having a top surface and a bottom surface and having a first interlocking element;
   (b) a support comprising a base plate with a plurality of stand-offs, each stand-off having a top surface and extending from the base plate to support the floor plate, wherein the top surface of at least one of the standoffs includes a second interlocking element for engaging the first interlocking element of the floor plate; and
   (c) a plurality of channels defined by the base plate, the floor plate and the stand-offs.

17. A flooring system provided with apparatus for interfacing with and organizing cables located in channels, the flooring system comprising:
   (a) a plurality of supports;
   (b) means for connecting the supports;
   (c) a floor plate interlocking with the plurality of supports; and
   (d) a junction box comprising a housing, shaped to fit between and be held in place by the plurality of supports, having quick connect means for securing an outlet within the housing and a guard for preventing accidental contact with the outlet.

18. A flooring system according to claim 17 which the plurality supports are pedestals formed from interconnected strips that attach to a floor.

19. A flooring system according to claim 18 further comprising means for providing access through the floor plate to service lines traveling through the channels and routed to the junction box.

\* \* \* \* \*

UNITED STATES PATENT AND TRADEMARK OFFICE
CERTIFICATE OF CORRECTION

PATENT NO. : 5,673,522
DATED : October 7, 1997
INVENTOR(S) : Jan J. Schilham

It is certified that error appears in the above-indentified patent and that said Letters Patent is hereby corrected as shown below:

In the title on the cover page, delete "FORLOW" and insert
--FOR LOW--

Column 1 in the title delete "FORLOW" and insert
--FOR LOW--

On the cover page after Assignee, delete "GUILFORD, INC." and insert
--GUILFORD (DELAWARE), INC.

Column 12, claim 18, line 40, after "17" insert --in--

Column 12, claim 18, line 41, after "plurality" insert --of--

Signed and Sealed this

Fifth Day of September, 2000

Attest:

Q. TODD DICKINSON

*Attesting Officer*   *Director of Patents and Trademarks*